US006546439B1

(12) United States Patent
Strongin et al.

(10) Patent No.: US 6,546,439 B1
(45) Date of Patent: Apr. 8, 2003

(54) METHOD AND SYSTEM FOR IMPROVED DATA ACCESS

(75) Inventors: Geoffrey S. Strongin, Austin, TX (US); Qadeer A. Qureshi, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/207,970

(22) Filed: Dec. 9, 1998

(51) Int. Cl.[7] .............................................. G06F 12/00
(52) U.S. Cl. ........................ 710/52; 711/147; 711/154; 711/167
(58) Field of Search ................................ 711/158, 168, 711/151, 105, 137, 104, 147, 150, 154, 156, 167, 169, 217, 218; 710/5, 6, 36, 39, 52

(56) References Cited

U.S. PATENT DOCUMENTS

| | | | |
|---|---|---|---|
| 4,796,232 A | 1/1989 | House ........................ 365/189 |
| 5,440,713 A | 8/1995 | Lin et al. ..................... 395/485 |
| 5,509,136 A | 4/1996 | Korekata et al. ........... 395/478 |
| 5,630,096 A | 5/1997 | Zuravleff et al. ........... 395/481 |
| 5,666,494 A | 9/1997 | Mote, Jr. ..................... 395/481 |
| 5,745,913 A | 4/1998 | Pattin et al. ................. 711/105 |
| 5,761,706 A | 6/1998 | Kessler et al. .............. 711/118 |
| 5,761,708 A * | 6/1998 | Cherabuddi ................. 711/118 |
| 5,768,530 A * | 6/1998 | Sandorfi |
| 5,781,927 A * | 7/1998 | Wu ............................. 711/151 |
| 5,784,582 A | 7/1998 | Hughes ....................... 395/297 |
| 5,860,117 A | 1/1999 | Cherabuddi ................. 711/151 |
| 5,920,898 A | 7/1999 | Bolyn et al. ................. 711/167 |
| 6,026,464 A | 2/2000 | Cohen ............................ 711/5 |
| 6,047,001 A | 4/2000 | Kuo et al. ................... 370/428 |
| 6,085,291 A | 7/2000 | Hicks et al. ................. 711/137 |
| 6,092,156 A * | 7/2000 | Schibinger et al. ......... 711/145 |
| 6,092,158 A | 7/2000 | Harriman et al. ........... 711/151 |
| 6,104,417 A | 8/2000 | Nielsen et al. .............. 345/521 |
| 6,112,265 A * | 8/2000 | Harriman et al. ............. 710/40 |
| 6,173,375 B1 * | 1/2001 | Rozario ....................... 711/163 |
| 6,173,378 B1 * | 1/2001 | Rozario et al. ............. 711/163 |
| 6,253,262 B1 * | 6/2001 | Rozario et al. ............... 710/39 |
| 6,295,592 B1 * | 9/2001 | Jeddeloh ..................... 711/169 |

OTHER PUBLICATIONS

Intel Corporation, *Accelerated Graphics Port Interface Specification*, Revision 1.0 (Jul. 31, 1996), pp. ii–x and 1–151.
Mike Johnson, *Superscalar Microprocessor Design*, 1991, pp. 87, 233–235.
Random House, Inc., *Webster's American Dictionay—College Edition*, 1997, p. 865.

* cited by examiner

Primary Examiner—Matthew Kim
Assistant Examiner—C. P. Chace
(74) Attorney, Agent, or Firm—B. Noël Kivlin

(57) ABSTRACT

A method and system which will increase the ability of memory controllers to intelligently schedule accesses to system memory. The method and system provide a memory controller and a requested memory operation buffer structured so that at least one source attribute of a requested memory operation can be identified. In one instance, the requested memory operation buffer has queues, associated with data buses, which can be utilized to identify source attributes of requested memory operations. Examples of such queues are an Accelerated Graphics Port Interconnect queue associated with an Accelerated Graphics Port interconnect, a system bus queue associated with a system bus, and a Peripheral Component Interconnect bus queue associated with a Peripheral Component Interconnect bus where the queues can be utilized by a memory controller to identify the specific bus from which a requested memory operation originated. In another instance, the queues, associated with data buses, are structured such that one or more further source attributes—such as the identity of the request initiator, the priority of the request, whether the request is speculative, etcetera—of particular queued requested memory operations can be identified. In yet another instance, the requested memory operation buffer is structured such that one or more source attributes—such as the identity of the request initiator, the priority of the request, whether the request is speculative, etcetera—of particular queued requested memory operations can be identified.

32 Claims, 6 Drawing Sheets

METHOD AND SYSTEM FOR IMPROVED DATA ACCESS

CROSS-REFERENCE

The present invention is related to subject matter disclosed in the following co-pending applications:

1. United States patent application entitled "Method And System For Origin-Sensitive Memory Control And Access In Data Processing Systems", Ser. No. 09/208,305 filed Dec. 9, 1998, naming Geoffrey S. Strongin and Qadeer A. Qureshi as inventors;
2. United States patent application entitled, "Method And System For Generating And Utilizing Speculative Memory Access Requests In Data Processing Systems", Ser. No. 09/208,569 filed Dec. 9, 1998, naming Geoffrey S. Strongin and Qadeer A. Qureshi as inventors;
3. United States patent application entitled, "Method And System For Destination-Sensitive Memory Control And Access In Data Processing Systems", Ser. No. 09/208,522 filed Dec. 9, 1998, naming Geoffrey S. Strongin and Qadeer A. Qureshi as inventors;
4. United States patent application entitled, "Method And System For Page-State Sensitive Memory Control And Access In Data Processing Systems", Ser. No. 09/207,971 filed Dec. 9, 1998, naming Geoffrey S. Strongin and Qadeer A. Qureshi as inventors; and
5. United States patent application entitled, "Method And System For Memory Control And Access In Data Processing Systems", Ser. No. 09/208,570 filed Dec. 9, 1998, naming Geoffrey S. Strongin and Qadeer A. Qureshi as inventors.

In accordance with 37 CFR §1.121(b)(1)(iii), Appendix B contains marked up versions of the replacement paragraphs illustrating the newly introduced changes in the specification.

BACKGROUND OF THE INVENTION

1. Field of the Invention

The present invention relates, in general, to a method and system to be utilized in data processing systems. In particular, the present invention relates to a method and system to be utilized in data processing systems wherein, for non-limiting example, a memory controller is utilized.

2. Description of the Related Art

Data processing systems are systems that manipulate, process, and store data and are notorious within the art. Personal computer systems, and their associated subsystems, constitute well known species of data processing systems. Personal computer systems in general and IBM compatible personal computer systems in particular have attained widespread use for providing computer power to many segments of today's modern society. A personal computer system can usually be defined as a desk top, floor standing, or portable microcomputer that includes a system unit including but not limited to a system processor and associated volatile and non-volatile memory, a display device, a keyboard, one or more diskette drives, one or more fixed disk storage devices, and one or more data buses for communications between devices. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses.

A computer system or data-processing system typically includes a system bus. Attached to the system bus are various devices that may communicate locally with each other over the system bus. For example, a typical computer system includes a system bus to which a central processing unit (CPU) is attached and over which the CPU communicates directly with a system memory that is also attached to the system bus.

In addition, the computer system may include a peripheral bus for connecting certain highly integrated peripheral components to the CPU. One such peripheral bus is known as the Peripheral Component Interconnect (PCI) bus. Under the PCI bus standard, peripheral components can directly connect to a PCI bus without the need for glue logic. Thus, PCI is designed to provide a bus standard on which high-performance peripheral devices, such as graphics devices and hard disk drives, can be coupled to the CPU, thereby permitting these high-performance peripheral devices to avoid the general access latency and the band-width constraints that would have occurred if these peripheral devices were connected to a low speed peripheral bus. Details on the PCI local bus standard can be obtained under the PCI Bus Specification, Revision 2.1, from the PCI Special Interest Group, which is hereby incorporated by reference in its entirety.

Two relatively high-bandwidth types of traffic that are communicated to and from system memory are 1394 device traffic and networking traffic. The 1394 device traffic originates within a high speed serial device which communicates with the system through and over a Southbridge. The networking traffic originates within a network card which is reading network traffic information, regarding one or more networks of which the data processing system is a part, from a network buffer.

Relatively recently, techniques for rendering three-dimensional (3D) continuous-animation graphics have been implemented within PCs which have exposed limitations in the originally high performance of the PCI bus. The AGP interface standard has been developed to both (1) reduce the load on the PCI bus systems, and (2) extend the capabilities of systems to include the ability to provide 3D continuous-animation graphics with a level of quality previously found only on high-end computer workstations. The AGP interface standard adds an additional bus to data processing systems: the AGP Interconnect. The AGP interface standard is defined by the following document: Intel Corporation, *Accelerated Graphics Port Interface Specification*, Revision 1.0 Jul. 31, 1996).

The AGP interface standard reduces the load on PCI bus systems and extends the capabilities of systems to include the ability to provide 3D continuous-animation graphics via a rather indirect process. Under the AGP interface standard, a CPU independently processes the geometric and texturing data (geometric and texturing data are data necessary to properly define an object to be displayed) associated with each object to be displayed in a scene. Subsequent to processing the geometric and texturing data, the CPU writes the geometric and texturing data back into system memory. Thereafter, the CPU informs a graphics processor that the information is ready, and the graphics processor retrieves the information from the system memory.

In current industry architectures, each preceding discussed bus (e.g., the system bus, the AGP interconnect, and the PCI bus) independently articulate with the system memory through a device known as the Northbridge. The various communications with, or accesses of, system memory are generally controlled by a device within the Northbridge known as a "memory controller."

A memory controller controls system memory which is typically a collection of Direct Random Access Memory chips (DRAMs). The computer system memory, composed of DRAMs, can store data, but there is conventionally no intelligence in the system memory. The intelligence concerning how data is going to be stored, where the data is going to be stored, how the data is going to be read or written, etc., is provided by the "memory controller."

The memory controller controls access to system memory, which as has been noted is typically composed of DRAMs. A DRAM can be thought of as a collection of cells, or storage locations, wherein data is stored. For simplicity it will be assumed here that each cell stores a byte, but those skilled in the art will recognize that other storage sizes are possible.

When a memory access, such as a read cycle, is engaged in, the memory controller is given an address by another device, such as a graphics controller. That address needs to correctly specify one of the cells where data is actually stored. Ordinarily, cells within DRAMs are arranged in row and column format (i.e., the cells are arranged like a matrix).

Consequently, an address, which for sake of illustration will be assumed to be 16 bits long, customarily is conceived of as being composed of two parts: a first 8-bit portion of the address which is associated with a row address, and a second 8-bit portion which is associated with a column address (again, the bit lengths are hypothetical and merely utilized here for illustrative purposes). This fragmentation of the address into row and column portions allows the address to correctly specify a storage location, or cell, by its row and column.

Conventionally, a DRAM has at least two buses, or at least hypothetically what can be treated as two buses: a data bus, and an address bus. To minimize DRAM hardware, it is customary that the address bus be only half as wide as the address bits required to uniquely identify a data cell. The foregoing is done in order to minimize the number of pins on the DRAM, which those skilled in the art will recognize is a major constraint or limiting factor on how small one can make a DRAM chip. Due to this limitation on the width of the address bus, memory access is typically achieved by first placing the row portion of the address on the address bus, which will select the appropriate row, and second, a short time later, placing the column portion of the address on the address bus, which will select the appropriate column. This then correctly specifies the row and column location of the storage location that is desired. At some time after the row and column information have both been specified, the data from the memory location specified by the row and column address appears on the DRAM data bus.

From the foregoing, it can be seen that in order to make a single memory read access there are three phases: a row address phase, a column address phase, and a data retrieval phase. In the past, it was noticed that typical programs tend to operate sequentially, so if there is a memory address accessed, it is likely that the next memory address accessed will be the very next cell, which means that the column address is likely to change, while the row address is not likely to change. Consequently, typical DRAMs are structured such that once the row address has been driven, thereafter the DRAM responds to new addresses on the address bus as if those addresses are column indicators, and thus will use such addresses as column addresses within a current row until the DRAM is notified that a new row address will be appearing on the address bus. DRAM devices using this scheme (driving the row once and then operating upon columns within the row) are known in the art as "page mode" DRAMs.

In light of the foregoing, in the event that a memory controller has several memory accesses to be done sequentially, then once a page is open it makes sense from an efficiency standpoint to examine pending as well as current memory accesses in order to determine which of those pending memory accesses will be to memory locations that are within a currently open page (that is, the row of the request is the row from which a memory controller is currently reading within a DRAM). In other words, assuming a page X is open, if there are four memory accesses A, B, C, and D, waiting to be performed, and assuming the first access A is to page Z, the second access B is to page X, the third access C is to page Y, and the fourth access D is to page W, it is preferable from a memory efficiency standpoint that the data access (i.e., access B) appropriate to the page that is open (i.e., page X) be made first.

Current memory controllers already "look ahead" to see if pending memory accesses are destined for currently open pages. Furthermore, at any given time, typically more than one page of memory is generally open. For example under the Direct RDRAM scheme (expected to be available in the near future), it is expected that up to 8 pages per RDRAM chip will be open simultaneously. Thus, if a system has eight RDRAM chips (a reasonable assumption), it will be possible to have up to 64 pages open simultaneously. Thus, when multiple memory accesses are to be sequentially executed, an efficient strategy which may be employed by the memory controller is that it selects which ones of the memory accesses to be executed are intended for pages which are already open, completes those accesses first, and subsequently proceeds with the memory accesses which will require opening new pages. This greatly increases memory efficiency.

Controlling memory access via the use of "look ahead" is undeniably valuable. Furthermore, as the foregoing has shown, the ability of the memory controller to schedule memory access is currently becoming more important as both current and future system memories are likely to be able to provide a very large number of open pages of memory simultaneously. It is therefore apparent that a need exists in the art for a method and system which will increase the ability of memory controllers to intelligently schedule accesses to system memory.

SUMMARY OF THE INVENTION

It has been discovered that a method and system can be produced which will increase the ability of memory controllers to intelligently schedule accesses to system memory. The method and system provide a memory controller and a requested memory operation buffer structured so that at least one source attribute of a requested memory operation can be identified. In one instance, the requested memory operation buffer has queues, associated with data buses, which can be utilized to identify source attributes of requested memory operations. Examples of such queues are an Accelerated Graphics Port Interconnect queue associated with an Accelerated Graphics Port interconnect, a system bus queue associated with a system bus, and a Peripheral Component Interconnect bus queue associated with a Peripheral Component Interconnect bus where the queues can be utilized by a memory controller to identify the specific bus from which a requested memory operation originated. In another instance, the queues, associated with data buses, are structured such that one or more further source attributes—such as the identity of the request initiator, the priority of the request, whether the request is speculative, etcetera—of particular queued requested memory operations can be identified. In yet another instance, the requested memory operation buffer is structured such that one or more source attributes—such as the identity of the request initiator, the priority of the request, whether the request is speculative, etcetera—of particular queued requested memory operations can be identified.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of the best contemplated mode for carrying out the invention. The description is intended to be illustrative and should not be taken to be limiting.

Figure 1:
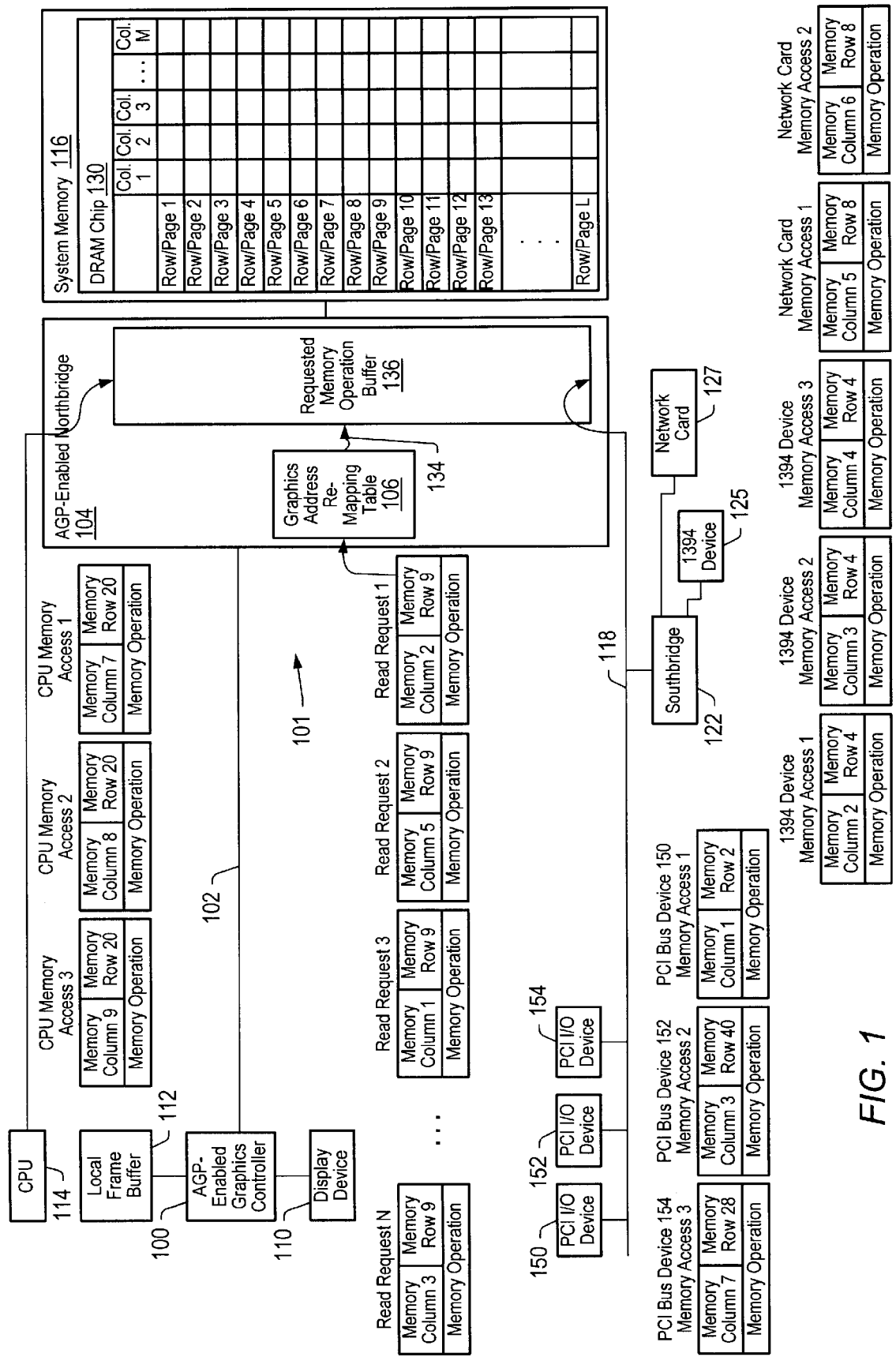
FIG. 1 shows a high-level component diagram depicting a related art AGP-enabled data processing system which forms an environment wherein one or more embodiments of the present invention may be practiced.

Referring now to FIG. 1, shown is a high-level component diagram depicting an AGP-enabled data processing system 101 which forms an environment wherein one or more embodiments of the present invention may be practiced. Shown are three building blocks of AGP: AGP-enabled graphics controller 100, AGP interconnect 102 (a data bus), and AGP-enabled Northbridge 104. Not shown, but deemed present is a fourth building block of AGP: an AGP-enabled operating system. The term AGP-enabled is intended to mean that the so-referenced components are engineered such that they interface and function under the standards defined within the AGP interface specification, referenced above. Further depicted are display device 110, local frame buffer 112, Central Processing Unit (CPU) 114, CPU bus 115, system memory 116, Peripheral Component Interconnect (PCI) bus 118, various PCI Input-Output (I/O) devices 150, 152, and 154, Southbridge 122, 1394 Device 125, and network card 127.

The foregoing components and devices are used herein as examples for sake of conceptual clarity. As for non-exclusive example, CPU 114 is utilized as an exemplar of any general processing unit, including but not limited to multiprocessor units; CPU bus 115 is utilized as an exemplar of any processing bus, including but not limited to multiprocessor buses; PCI bus 118 is utilized as an exemplar of any input-output device attached to an I/O bus; Northbridge 104 and Southbridge 122 are utilized as exemplars of any type of bridge; 1394 device 125 is utilized as an exemplar of any type of isochronous source, and network card 127 is an exemplar of any type of network devices. Consequently, as used herein these specific exemplars are intended to be representative of their more general classes. Furthermore, in general, use of any specific exemplar herein is also intended to be representative of its class and the non-inclusion of such specific devices in the foregoing list should not be taken as indicating that limitation is desired.

Generally, each bus utilizes an independent set of protocols (or rules) to conduct data (e.g., the PCI local bus specification and the AGP interface specification). These protocols are designed into a bus directly and such protocols are commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI bus to a CPU on a CPU bus. Thus, a mechanism is developed for "translating" data that are required to be transferred from one bus architecture to another. This translation mechanism is normally contained in a hardware device in the form of a bus-to-bus bridge (or interface) through which the two different types of buses are connected. This is one of the functions of AGP-enabled Northbridge 104, in that it is to be understood that it translates and coordinates between the various data buses which communicate through AGP-enabled Northbridge 104.

Those skilled in the art will recognize that under the AGP interface standard a graphics controller is free to issue pipelined requests for data. Shown is that AGP-enabled graphics controller issues N (where N is some positive integer) read requests to read data from a particular cell, or row and column location, from DRAM chip 130 in system memory 116 prior to any of the N−1 outstanding read requests being answered. It should be noted that although for conceptual clarity the read requests are shown in FIG. 1 as labeled requests 1 through N, under the AGP standard there is no such labeling, and under the AGP standard such ordering is merely denoted by transmission order of the requests. Further illustrated is that within DRAM chip 130 each row can be conceptualized as a "page" in memory.

Those skilled in the art will recognize that the AGP interface standard allows AGP-enabled devices to treat AGP memory as if it were one contiguous whole, while in point of fact it may consist of several discontiguous regions of system memory. Accordingly, under the AGP-interface standard read requests to system memory first transit 132, 134 Graphics Address Re-mapping Table (GART) 106 prior to being loaded into requested memory operation buffer 136. Ordinarily, GART 106 re-maps the row and column AGP-memory addresses for which accesses are requested into row and column physical memory addresses. However, for sake of clarity of presentation and understanding, herein GART 106 will be treated as if it is transparent to the process. That is, while those skilled in the art will recognize that GART 106 will typically re-map requested addresses, in the present detailed description GART 106 will be treated as if it merely passes the addresses through without re-mapping them so that the embodiments discussed herein can be more clearly understood.

Those skilled in the art will recognize that under some CPU bus protocols, CPU 114 is free to issue pipelined memory accesses. Shown is that CPU 114 issues 3 memory accesses, each of which is to a particular cell, or row and column location, within DRAM chip 130 in system memory 116 prior to any of the 2 outstanding memory accesses being performed. It should be noted that although for conceptual clarity the read requests are shown in FIG. 1 as labeled requests 1 through 3, under the CPU bus standards there is no such labeling, and under the CPU bus standards such ordering is merely denoted by transmission order of responses to the requested accesses.

Depicted are three PCI bus devices 150–154 which are shown to have placed 3 separate memory access requests on PCI bus 118. It will be understood by those within the art that ordinarily only one such PCI bus device memory access may be resident on PCI bus 118 at any particular time. Consequently, it will be understood by those within the art that the depicted 3 PCI bus 118 memory access requests are illustrative of the three requests occurring at three distinct different instances in time.

Historically, any PCI bus device requesting memory access via PCI bus 118 had to wait for the requested memory access to be completed prior to relinquishing PCI bus 118. This was found to result in inefficiency due to PCI bus 118 being monopolized by any such PCI bus device waiting for an access to complete. It has been found that a way around the monopolization problem is to terminate each PCI request to access memory without waiting for the data to be manipulated by the request to travel all the way from/to memory (i.e., without waiting for the cycle to complete). For example, it is conceivable to have multiple PCI requests outstanding within AGP-enabled Northbridge 104 by mandating that AGP-enabled Northbridge 104, in response to a request for memory access from PCI bus 150–154, direct the PCI master to retry, which will result in the PCI master releasing the bus thus freeing PCI bus 118 so that other PCI masters can issue requests. Any subsequently retried accesses will often be completed quickly because AGP-enabled Northbridge 104 will typically have the data ready when the request is retried. Thus, the foregoing schemes demonstrate that there could be multiple memory transactions pending within AGP-enabled Northbridge 104 from various PCI devices at any given time, even though PCI bus 118 can ostensibly support only one transaction at a given time.

Likewise with the five remaining accesses depicted. Although depicted are three 1394 device 125 memory access requests, it will be understood by those within the art that ordinarily only one such memory access may be resident on PCI bus 118 at any particular time. In like fashion, although depicted are two network card 127 memory access requests, it will be understood by those within the art that ordinarily only one such memory access may be resident on PCI bus 118 at any particular time. Consequently, it will be understood by those within the art that the depicted five remaining memory access requests are illustrative of the five requests occurring at five distinct instances in time. Lastly, illustrated is that 1394 device 125 requests and network card 127 requests travel to and from AGP-enabled Northbridge 104 by and through Southbridge 122 in conjunction with PCI bus 118.

Figure 2:
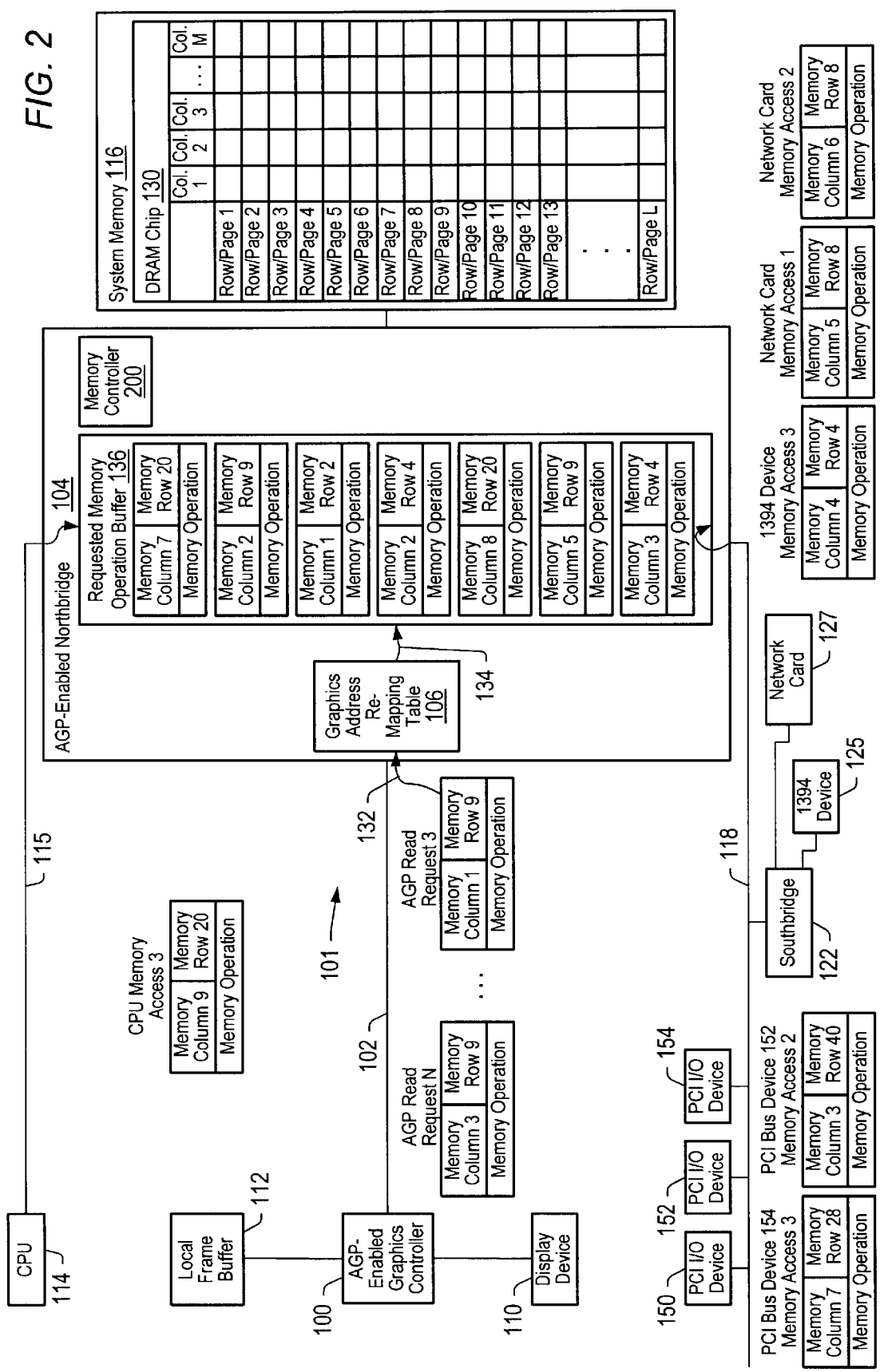
FIG. 2 depicts a high-level block diagram illustrating in broad overview how the AGP-enabled system of FIG. 1, which forms an environment wherein one or more embodiments of the present invention may be practiced, accesses memory and manipulates data within the memory locations specified by the memory access requests illustrated in FIG. 1.

Referring now to FIG. 2, shown is a high-level block diagram-illustrating in broad overview how the AGP-enabled system 101 of FIG. 1, which forms an environment wherein one or more embodiments of the present invention may be practiced, accesses memory and manipulates data within the memory locations specified by the memory access requests illustrated in FIG. 1. Shown are AGP-enabled graphics controller 100, AGP interconnect 102 (a data bus), and AGP-enabled Northbridge 104. The remaining shown components function substantially similar to the like-numbered components described in relation to FIG. 1.

As has been shown in relation to FIG. 1, in a typical data processing system multiple devices are often vying for access to system memory 116, a fact illustrated in FIG. 1 by the fact that various and different requests to access system memory 116 are simultaneously present on CPU bus 115, AGP interconnect 102, and PCI bus 118. Those skilled in the art will recognize that there are a myriad of ways in which the various requests vying for system memory access can be serviced. For sake of illustration, depicted in FIG. 2 is that the requests are serviced in counter-clockwise "round-robin" fashion, starting with the requests on CPU bus 115. That is, depicted in FIG. 2 is that CPU memory access 1 is the first requested memory operation loaded into requested memory operation buffer 136; thereafter, in accordance with a counter-clockwise round robin scheme, appear within requested memory operation buffer 136 AGP read request 1, PCI I/O device 150 request, 1394 device memory access 1, CPU memory access 2, AGP read request 2, and 1394 device memory access 2. The order in which the requests appear in requested memory operation buffer 136 is consistent with the round-robin scheme, with the understanding that 1394 device memory access 2 appears on PCI bus 118 before PCI bus device memory access 2, and thus that is why 1394 device memory access 2 is shown as loaded in requested memory operation buffer 136.

With the requested memory operations so loaded, memory controller 200 can thereafter service the requests in requested memory operation buffer 136 in the fashion most efficient given the state of the system. For example, the requests can be serviced on the basis of open pages in memory, the direction of the system memory bus, or other criteria.

It has been discovered that the efficiency of memory controller 200 can be enhanced by making available to memory controller 200 information, available at various interfaces within AGP-enabled data processing system 101, regarding specific qualitative aspects of each memory request. Such information includes but is not limited to any one or more of the following: identification of an initiator of a request, identification of which stream or thread resulted in a requested access, whether or not a requested access is speculative, the urgency or priority of requested access, and whether or not requested access can be completed out of order. The embodiments herein will set forth various mechanisms by which such information can be conveyed. Utilizing such information, memory controller 200 can re-order memory transactions to substantially maximize memory efficiency. For example, memory controller 200 may group transactions from a single data source together, and may present these transactions to data chip (memory array) 130, while other transactions that were issued by a different initiator earlier may be held back. This approach can increase the page-hit rate, thus improving the memory subsystem performance. Similarly, among the transactions from a given source, the memory controller may re-order transactions such that accesses to the currently open pages are completed ahead of transactions that are targeted to pages that are not currently open.

Figure 3:
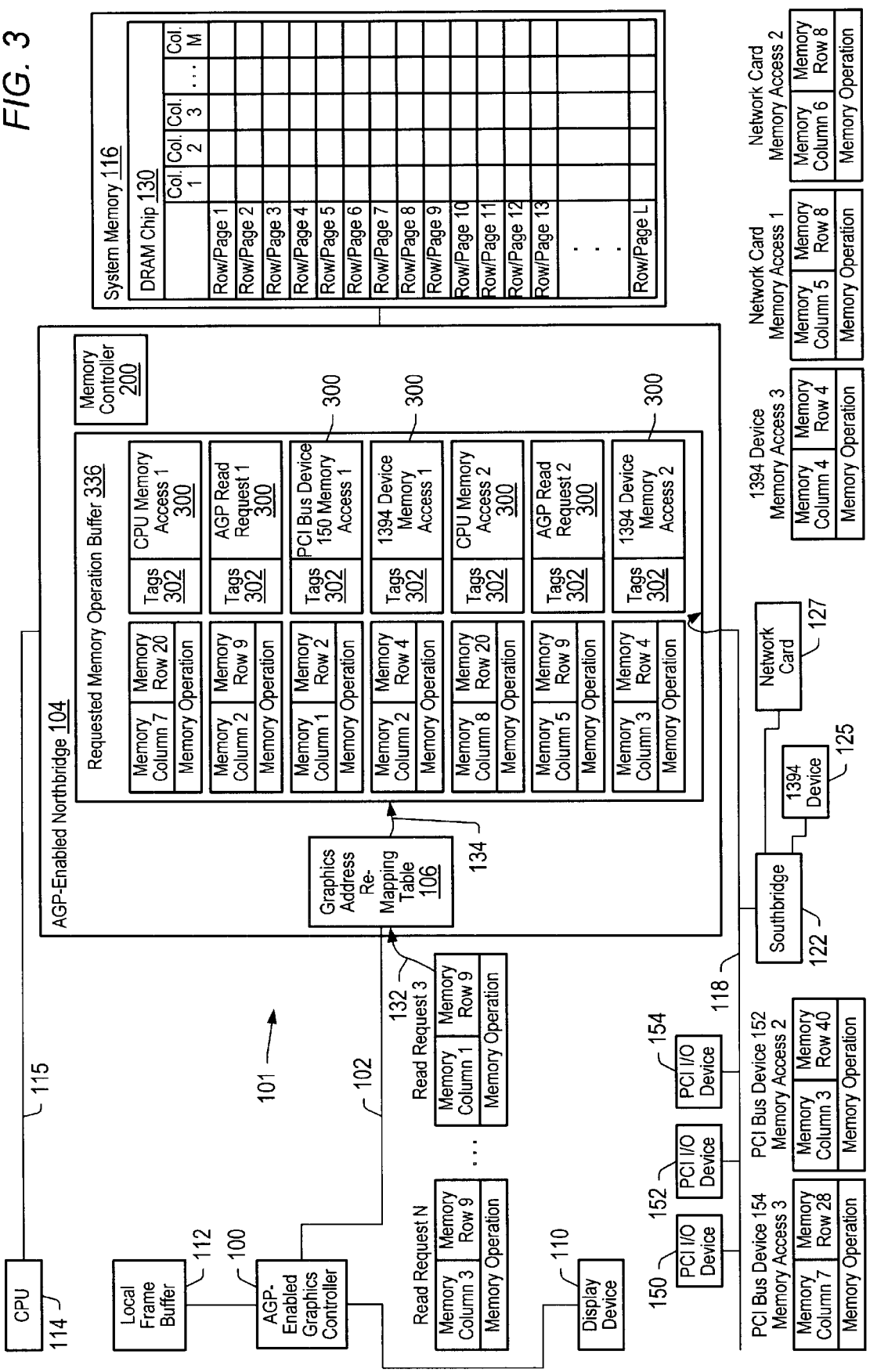
FIG. 3 illustrates pictographically an embodiment of the present invention wherein information available at various system interfaces is carried all the way to the memory controller.

With reference now to FIG. 3, shown is a high-level pictographic representation of an embodiment of the present invention wherein information available at various system interfaces is carried all the way to the memory controller. Depicted is that requested memory operation buffer 336 may be structured such that each memory operation in requested memory operation buffer 336 may be associated with an indicator 300 of the initiator of the requested memory transaction. Further shown is that requested memory operation buffer 336 may be further structured such that each memory operation within requested memory operation buffer 336 may also have associated with that memory operation a "tag" 302 which may contain one or more units indicative of one or more parameters related to the transaction in question. Utilizing such information, memory controller 200 can now more efficiently service the memory requests on the basis of the initiator, or any tags that may be present, or any combination of such information (e.g., any tags and/or initiator id) which may be present.

Figure 4:
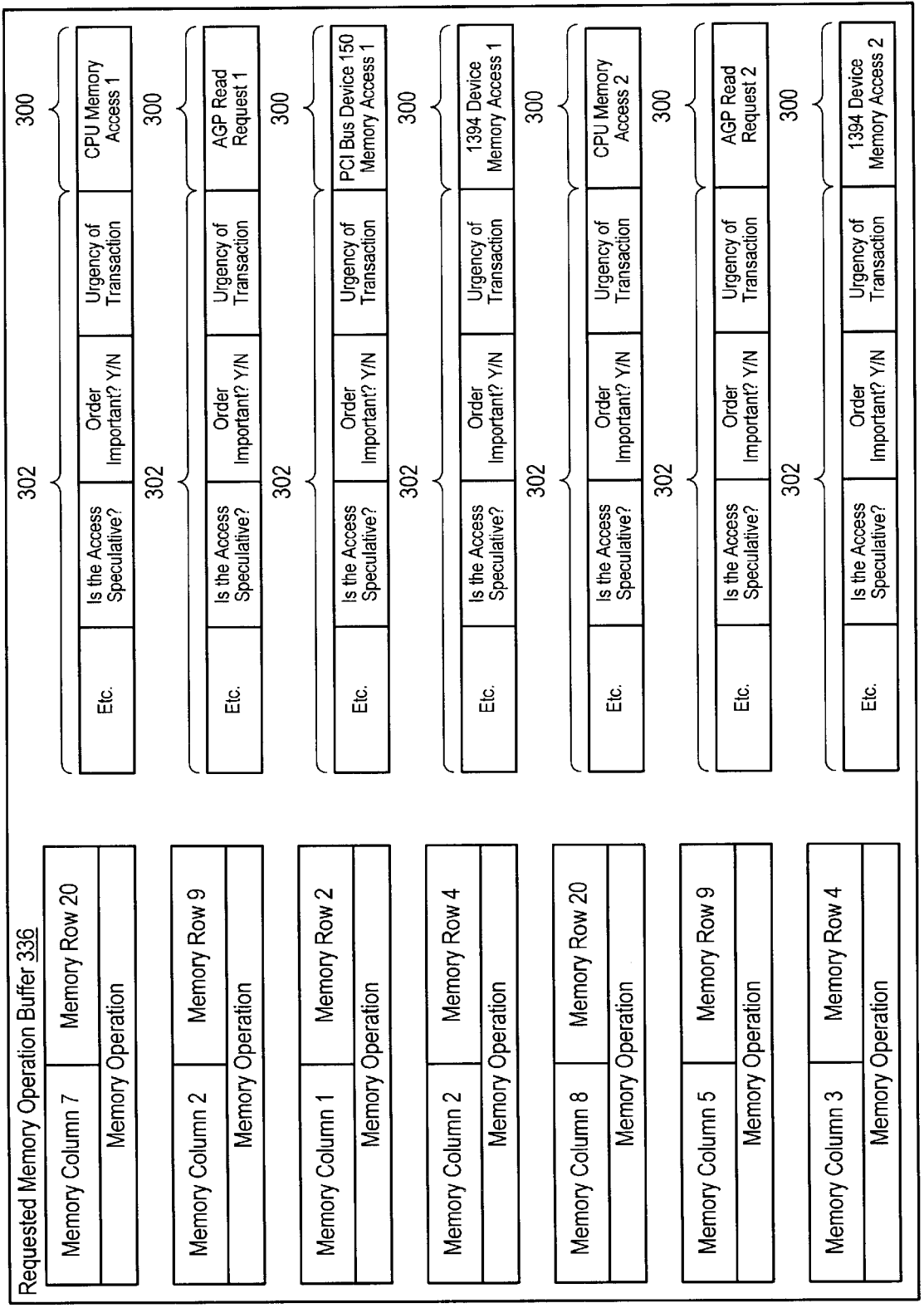
FIG. 4 shows pictographically another embodiment of the present invention which depicts non-exclusive examples of information that may be contained within tags.

Referring now to FIG. 4, shown is another embodiment which depicts non-exclusive examples of information that may be contained within tags 302. Illustrated is an expanded view of requested memory operation buffer 336. Depicted is that tags 302 may contain within them information related to the urgency of the transaction (such as a priority), whether the transaction received from an initiating source must be answered in the order received, whether the access is speculative, etc. It is to be understood that although the identity of the initiator, the urgency of the transaction, the ordering information, and the speculative nature of the requested memory accesses are denoted, such specific items of information are exemplary and are not intended to be limiting, and that each of the items of information shown can appear in isolation or in combination with any other items of like information; furthermore, it will be appreciated by those within the art that many other types of information related to each memory transaction are available at each system interface, and that such information is intended to be encompassed within the embodiment shown. Likewise it is to be understood that each tag 302 need not be of the same length nor contain the same type of information in order to fit within the spirit of the embodiment shown.

Figure 5:
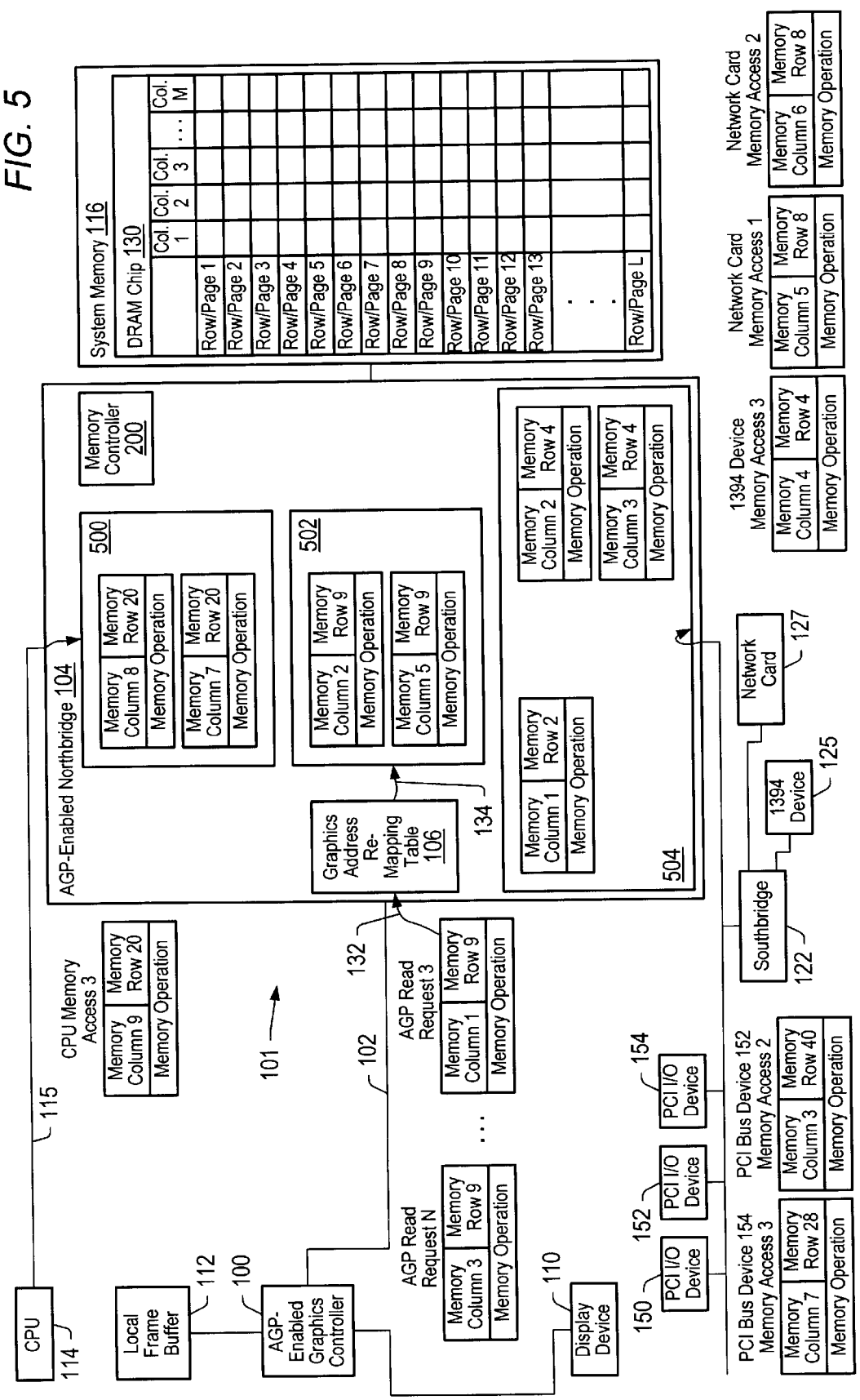
FIG. 5 depicts an embodiment of the present invention which utilizes queues dedicated to each bus wherein the queues serve to transmit information related to the identity of the bus upon which the queued memory transactions originate.

With reference now to FIG. 5, shown is an embodiment of the present invention which utilizes queues dedicated to each bus wherein the queues serve to transmit information related to the identity of the bus upon which the queued memory transactions originate. Depicted is that the memory access requests originating on CPU bus 115 are deposited in CPU bus queue 500, the memory access requests originating on AGP interconnect 102 are deposited in AGP interconnect queue 502, and the memory access requests originating on PCI bus 118 are deposited in PCI bus queue 504. Thus, due to their association with the various buses, queues 500–504 convey information about the sources of queued memory transactions. Consequently, memory controller 200 can then utilize such information in making decisions relative to the order in which the queued memory requests will be serviced. It should be noted that CPU bus queue 500, AGP interconnect queue 502, and PCI bus queue 504 function to buffer requested memory operations as did requested memory operation buffer 336, but do so in such a way that the queue's associations with their respective buses serves to identify the bus over which specific buffered requested memory operations arrived.

Figure 6:
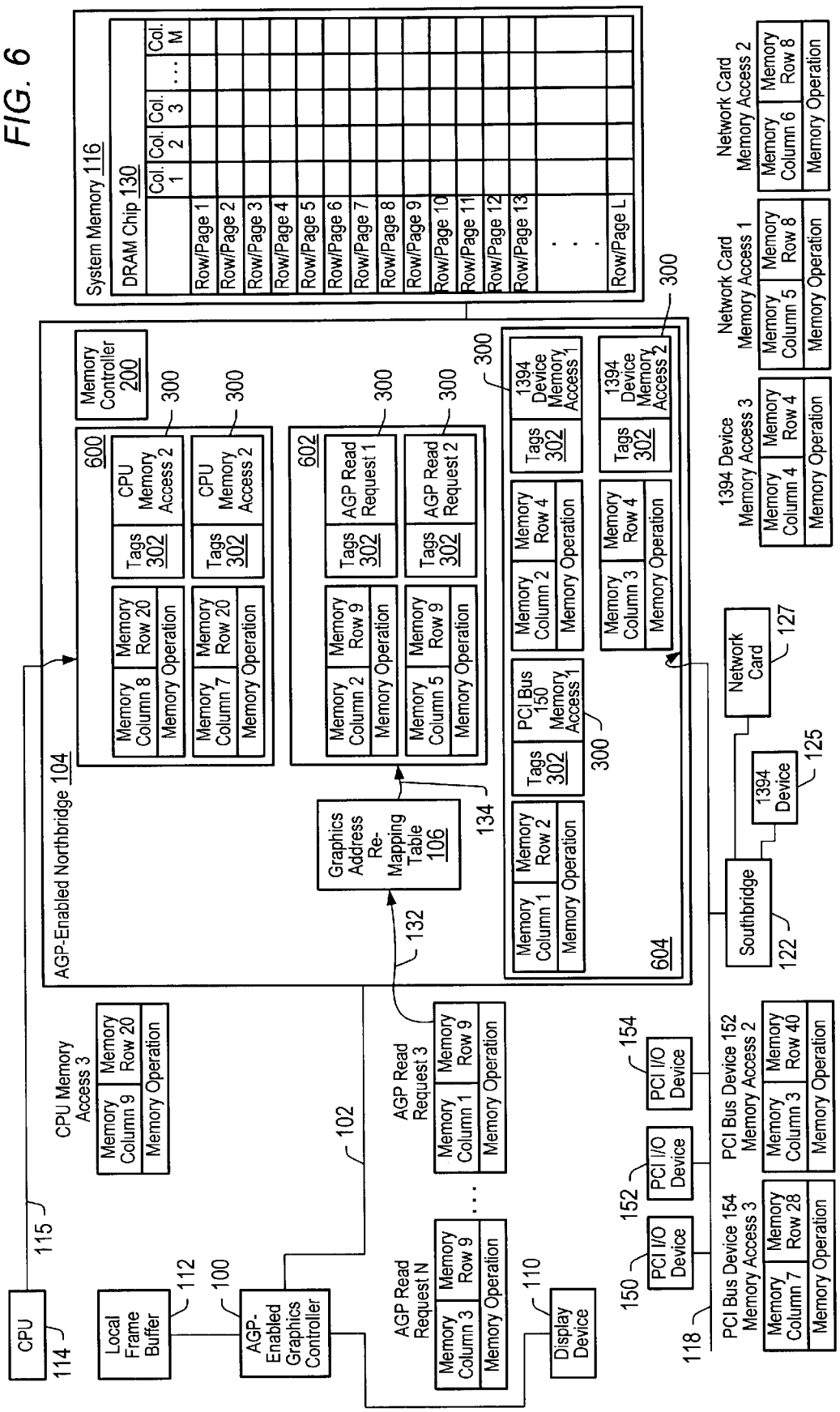
FIG. 6 illustrates another embodiment of the present invention wherein dedicated queues and tags are combined to provide source attribute information.

Referring now to FIG. 6, shown is another embodiment of the present invention. Depicted is that the memory access requests originating on CPU bus 115 are deposited in CPU bus queue 600, the memory access requests originating on AGP interconnect 102 are deposited in AGP interconnect queue 602, and the memory access requests originating on PCI bus 118 are deposited in PCI bus queue 604. Thus, due to their association with the various buses 102, 115, 118, queues 600–604 convey information about the sources of the queued memory transactions. Illustrated is that each queue 600–604 may be structured such that each memory operation in each queue 600–604 may be associated with an indicator 300 of the initiator of the requested memory transaction. Further shown is that each queue 600–604 may be further structured such that each memory operation within each queue 600–604 may also have associated with that memory operation a "tag" 302 which may contain one or more units indicative of one or more parameters related to the transaction in question (especially as such tags were discussed in relation to FIG. 4). Utilizing such information, memory controller 200 can now more efficiently service the memory requests on the basis of the bus from which the memory transaction originates, the initiator, or any tags that may be present, or any combination of the information (e.g., bus and/or tags and/or initiator id) which may be present. It should be noted that CPU bus queue 600, AGP interconnect queue 602, and PCI bus queue 604 function to buffer requested memory operations as did requested memory operation buffer 336, but do so in such a way that the queue's associations with their respective buses serves to identify the bus over which specific buffered requested memory operations arrived.

The foregoing described embodiments have related many ways in which information related to pending memory access requests can be relayed to a memory controller such that the memory controller can more efficiently service such pending requests. The information conveyed by the foregoing embodiments substantially ensure that (1) the memory controller has enough information to make more intelligent arbitration decisions, (2) the memory controller can re-order accesses to better utilize open pages, (3) the memory controller can determine when to open or close a page ahead of time base on source information, and (4) the depth of the logic that needs to perform look ahead is reduced because only a few entries in each source specific queue need to be looked ahead for prediction and/or reordering.

The foregoing detailed description set forth various embodiments of the present invention via the use of block diagrams, pictographic representations, and examples. It will be understood as notorious by those within the art that each component, step, and operation illustrated by the use of block diagrams, pictographic representations, and examples can be implemented, individually and/or collectively, by a wide range of hardware, software, firmware, or any combination thereof. In one embodiment, the present invention is implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this specification.

OTHER EMBODIMENTS

Several various embodiments have been described above, and it will be obvious to those skilled in the art that, based upon the teachings herein, changes and modifications may be made without departing from this invention and its broader aspects. That is, all examples set forth herein are intended to be exemplary and non-limiting.

For example, while the foregoing described embodiments were described only in the context of one processor, it will be apparent to those skilled in the art that the embodiments could be extended to systems with multiple processors by using an identifier for the additional processor(s). Furthermore, it will also be apparent within the art that the embodiments could likewise and additionally be extended to multiple redundant bus systems, such as multiple PCI bus systems. Additionally, while the various buffers have been described herein as contained within a Northbridge, those skilled in the art will recognize that such location is somewhat arbitrary, and that such buffers could be distributed to other components throughout a system so long as the appropriate functionalities were preserved. Accordingly, the described architectures are not intended to be limiting.

Also for example, while the embodiments have been described in the context of the AGP interface standard, it will be recognized that the embodiments herein can be applied to other similar problems which exist in other non-AGP interface standard systems wherein similar problems analogous to those solved by the present invention exist. For example, data processing systems wherein the AGP interface standard is not utilized, such as standard PCI and ISA systems. Thus, the specific protocols described are not intended to be limiting.

The foregoing described embodiments wherein the different components are contained within different other components (e.g., the speculative memory request response buffer checking and control logic unit contained within centralized state machine). It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial. Likewise, any two components so associated can also be viewed as being "operably connected", or "operably coupled", to each other to achieve the desired functionality.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when same claim includes the introductory phrases "one or more" or "at least one" and indefinite articles such as "a" or "an"; the same holds true for the use of definite articles.

What is claimed is:

1. A system, comprising:
    a requested memory operation buffer configured to receive memory requests from a plurality of sources, wherein said requested memory operation buffer is further configured to provide, for each memory request, a source indication of the one of said plurality of sources from which the memory request was received; and
    a memory controller configured to receive said memory requests and said source indication from said requested memory operation buffer, wherein said memory controller is configured to schedule accesses to a memory in response to said memory requests.

2. The system as recited in claim 1, wherein the memory controller is configured to group said memory requests together for one of said plurality of sources and reorder the grouped memory requests ahead of memory requests from another one of said plurality of sources.

3. The system as recited in claim 2, wherein the memory controller is further configured to reorder the grouped memory requests such that requests to a currently open page of the memory are completed ahead of requests to a page of the memory not currently open.

4. The system as recited in claim 1, wherein said requested memory operation buffer is further configured to provide one or more parameters for each said memory request in addition to said source indication to said memory controller for use in scheduling the memory requests.

5. The system as recited in claim 4, wherein the one or more parameters for each memory request comprise an identity of a request initiator for the memory request.

6. The system as recited in claim 4, wherein the one or more parameters for each memory request comprise a priority or urgency indicator for the memory request.

7. The system as recited in claim 4, wherein the one or more parameters for each memory request comprise an indication of whether or not the memory request is speculative.

8. The system as recited in claim 4, wherein the one or more parameters for each memory request comprise an identity of a stream or thread that initiated the memory request.

9. The system as recited in claim 4, wherein the one or more parameters for each memory request comprise an indication of whether or not the memory request can be completed out of order.

10. The system as recited in claim 4, wherein the one or more parameters for each memory request are stored within a tag associated with each memory request.

11. The system as recited in claim 1, wherein said plurality of sources comprises a central processing unit interface.

12. The system as recited in claim 1, wherein said plurality of sources comprises an Accelerated Graphics Port (AGP) interface.

13. The system as recited in claim 1, wherein said plurality of sources comprises a Peripheral Component Interconnect (PCI) interface.

14. The system as recited in claim 1, wherein said requested memory operation buffer comprises a separate memory request queue for each of said plurality of sources, wherein said requested memory operation buffer is further comprised to provide each memory request to said memory controller from one of said memory request queues, wherein said source indication corresponds to one of said memory request queues.

15. The system as recited in claim 1, wherein said source indication comprises an identity of a request initiator for the memory request.

16. The system as recited in claim 1, wherein said source indication comprises an identity of a stream or thread that initiated the memory request.

17. A method, comprising:
receiving memory requests from a plurality of sources;
associating a source indication for each memory request of the one of said plurality of sources from which the memory request was received; and
scheduling execution of said memory requests based on said source indication.

18. The method as recited in claim 17, wherein said scheduling comprises:
grouping said memory requests together for one of said plurality of sources; and
reordering the grouped memory requests ahead of memory requests from another one of said plurality of sources.

19. The method as recited in claim 18, wherein said reordering comprises reordering the grouped memory requests such that requests to a currently open page of a memory are completed ahead of requests to a page of the memory not currently open.

20. The method as recited in claim 17, further comprising associating one or more parameters with each said memory request in addition to said source indication for use in said scheduling.

21. The method as recited in claim 20, wherein the one or more parameters for each memory request comprise an identity of a request initiator for the memory request.

22. The method as recited in claim 20, wherein the one or more parameters for each memory request comprise a priority or urgency indicator for the memory request.

23. The method as recited in claim 20, wherein the one or more parameters for each memory request comprise an indication of whether or not the memory request is speculative.

24. The method as recited in claim 20, wherein the one or more parameters for each memory request comprise an identity of a stream or thread that initiated the memory request.

25. The method as recited in claim 20, wherein the one or more parameters for each memory request comprise an indication of whether or not the memory request can be completed out of order.

26. The method as recited in claim 20, wherein the one or more parameters for each memory request are stored within a tag associated with each memory request.

27. The method as recited in claim 17, wherein said plurality of sources comprises a central processing unit interface.

28. The method as recited in claim 17, wherein said plurality of sources comprises an Accelerated Graphics Port (AGP) interface.

29. The method as recited in claim 17, wherein said plurality of sources comprises a Peripheral Component Interconnect (PCI) interface.

30. The method as recited in claim 17, wherein said associating a source indication for each memory request comprises placing each memory requests in a separate memory request queue for each of said plurality of sources.

31. The method as recited in claim 17, wherein said source indication comprises an identity of a request initiator for the memory request.

32. The method as recited in claim 17, wherein said source indication comprises an identity of a stream or thread that initiated the memory request.

* * * * *